US011945228B2

(12) United States Patent
Middleton

(10) Patent No.: US 11,945,228 B2
(45) Date of Patent: Apr. 2, 2024

(54) UPWARD JETTING INK JET PRINTING SYSTEM

(71) Applicant: Metas, LLC, Grand Rapids, MI (US)

(72) Inventor: Blake Middleton, Grandville, MI (US)

(73) Assignee: Metas, LLC, Grand Rapids, MI (US)

( * ) Notice: Subject to any disclaimer, the term of this patent is extended or adjusted under 35 U.S.C. 154(b) by 125 days.

(21) Appl. No.: 17/836,274

(22) Filed: Jun. 9, 2022

(65) Prior Publication Data

US 2022/0396076 A1 Dec. 15, 2022

Related U.S. Application Data

(60) Provisional application No. 63/208,537, filed on Jun. 9, 2021.

(51) Int. Cl.
*B41J 2/175* (2006.01)

(52) U.S. Cl.
CPC .................................... *B41J 2/175* (2013.01)

(58) Field of Classification Search
CPC ............ B41J 29/377; B41J 2/175; B41J 2/18
See application file for complete search history.

(56) References Cited

U.S. PATENT DOCUMENTS 8,708,476 B2 * 4/2014 Sasaki ................ B41J 11/00244 347/17
10,787,002 B1 * 9/2020 Liu ......................... B41F 23/02
11,465,426 B2 * 10/2022 Landa .................... B41J 2/0057

* cited by examiner

*Primary Examiner* — An H Do
(74) *Attorney, Agent, or Firm* — The Dobrusin Law Firm, PC

(57) ABSTRACT

A system and method upwards ink deposit onto a substrate in existing printing systems. The system provides for multiple orientations of the print head including jetting in the vertical (or generally upwards) direction to mark a substrate. The system allows the ink jetting to be easily integrated into existing converting or printing processes without the need to add auxiliary web transporting devices such as a turn bar since the print head is jetting the pigment-based ink sets vertically as illustrated in the document provided. To jet vertically the ink viscosity needs to be closely controlled utilizing in line ink heating systems that are deployed throughout the ink supply circuit. The system measures the difference between meniscus and pressure with a predetermined amount of heat applied to the system using in line/integrated heating devices in order to accomplish a vertical jet at speed.

15 Claims, 2 Drawing Sheets

UPWARD JETTING INK JET PRINTING SYSTEM

CROSS REFERENCE TO RELATED APPLICATIONS

This application claims priority and benefit to Provisional Patent Application Ser. No. 63/208,537 filed on Jun. 9, 2021.

TECHNICAL FIELD

The present specification generally relates to printers and, more specifically, to a printing system capable of printing from different angles, such as upwards.

BACKGROUND

Typically, inkjet printing systems deposit ink in a downwards direction onto a substrate. However, these well-known systems do not allow for replaceability and/or substitution in existing systems.

Accordingly, there exists a need in the art to provide an improved ink jet printing system overcoming the aforementioned disadvantages.

SUMMARY

An upward jetting printing system configured to deposit ink on media, the system having a print head, the print head configured to direct ink in an upward direction, an ink delivery system configured to move ink through the system, and at least one heater, the heater configured to heat the ink to a predetermined temperature, wherein the ink delivery system, the heater, and the print head are connected together under pressure in line together, wherein ink moves from the ink delivery system to the heater and to the print head wherein unused ink returns back to the ink delivery system.

In some systems, the print head shoots ink upwards in a generally vertical direction. In some systems, the media moves in a generally horizontal direction over the print head during the printing process. The media may be moved by means of at least one roller. The ink delivery system may be a pump. The predetermined temperature may be between 30-75° C. A second heater may be positioned in-line between the print head and the ink delivery system in a return line.

A method is provided using the aforementioned apparatus including the steps of determining pressure of the in-line system, determining meniscus of the in-line system, determining the difference between meniscus and pressure resulting in a value and adjusting the temperature of the heater to achieve desired upward printing result.

An upward jetting printing system configured to deposit ink on media, the system may include a print head, the print head configured to direct ink in an upward direction, an ink delivery system configured to move ink through the system, a first heater, the heater configured to heat the ink to a predetermined temperature, and a second heater, the second heater positioned in line between the print head and the in delivery system when returning the ink back to the ink delivery system, wherein the ink delivery system, the heater, and the print head are connected together under pressure in line together, wherein ink moves from the ink delivery system to the heater and to the print head wherein unused ink returns back to the ink delivery system.

In some systems, the print head shoots ink upwards in a generally vertical direction. In some systems, the media moves in a generally horizontal direction over the print head during the printing process. The media may be moved by means of at least one roller. The ink delivery system may be a pump. The predetermined temperature may be between 30-75° C.

A method is provided using the aforementioned apparatus including the steps of determining pressure of the in-line system, determining meniscus of the in-line system, determining the difference between meniscus and pressure resulting in a value and adjusting the temperature of the heater to achieve desired upward printing result.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which.

DETAILED DESCRIPTION

The present system as disclosed herein provides for vertical upwards ink deposit onto a substrate in existing, (or as a standalone print printing system) printing systems. The system provides for multiple orientations of the print head (also referred to as a print stack) including jetting in the vertical (upwards) direction to mark a substrate. The present configuration allows the ink jetting (also referred to as a marking system) to be easily integrated into existing converting or printing processes without the need to add auxiliary web transporting devices such as a turn bar since the print head is jetting the ink sets vertically as illustrated in the document provided. To jet vertically the ink viscosity needs to be closely controlled utilizing in line ink heating systems that are deployed throughout the ink supply circuit. The standoff (linear distance) between the ink supply vacuum cylinders and nozzle plate also plays a critical role in the ability to jet vertically. The system configuration can utilize many different types of print heads and is not limited to a single print head OEM to perform the same function.

The system measures the difference between meniscus and pressure with a predetermined amount of heat applied to the system using in line/integrated heating devices in order to accomplish a vertical jet at speed. Measuring the meniscus and pressure and applying heat as needed enables control of the upward movement of the ink. To find optimal jetting temperature the viscosity of the fluid to be jetted paired with the parameters of the print head being used determine what temperature to heat the fluid to.

Figure 1:
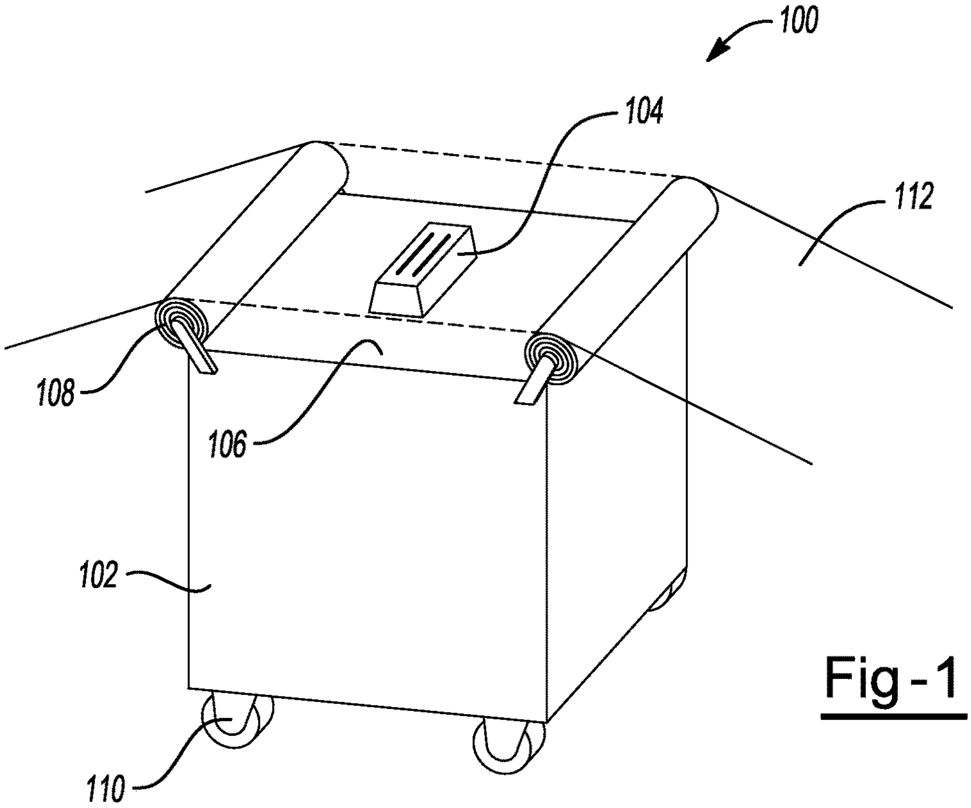
FIG. 1 depicts a perspective view of the printer apparatus and system having an upward printing configuration according to one or more embodiments shown and described herein.

FIG. 1 generally depicts the print system of the present specification. The printer 100 includes the housing 102 and the print head or heads 104. The housing may be positioned on rollers 110 to allow for portability. The print head 104 is configured to direct ink upwards towards a media 112. The media 112 may be a paper, fabric, vinyl, plastic, metal, or any other similar capable of being printed on. The print head 104 may be any suitable print head configured to print (or mark) the media 112 using an appropriate and corresponding ink. The housing 102 include an upper surface 106 configured to hold the print head 104 and a pair of rollers 108. The rollers 108 are configured to hold and move the media 112 over the print head 104. It should be appreciated that the present configuration as described herein can be modified structurally to achieve the same desired result. Any other means of moving said media may be provided including, but not limited to, rollers, pulleys, sliding mechanisms, or any other means to move said media 112 over the print head 104. Further, configurations of the print head 104 in relation to the media 112 may also vary but the upward jetting will remain consistent.

Figure 2:
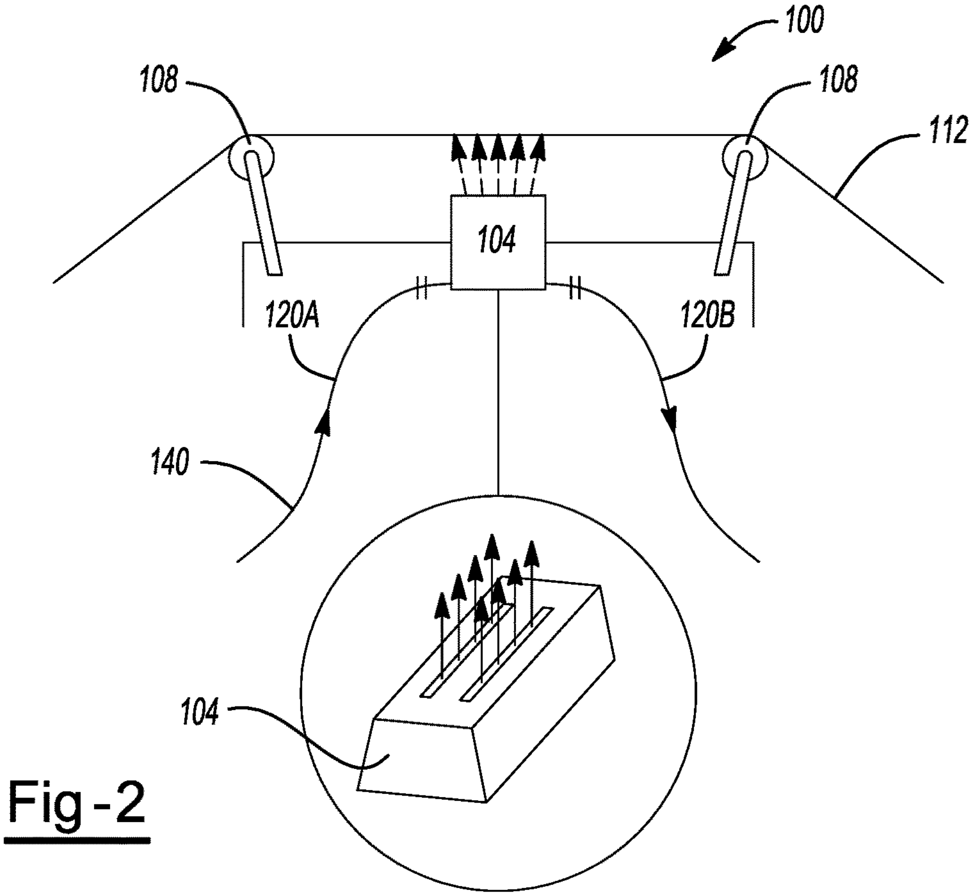
FIG. 2 depicts a partial schematic view of the print head moving ink upwards and an illustration of the movement of the ink supply according to one or more embodiments shown and described herein.
Figure 3:
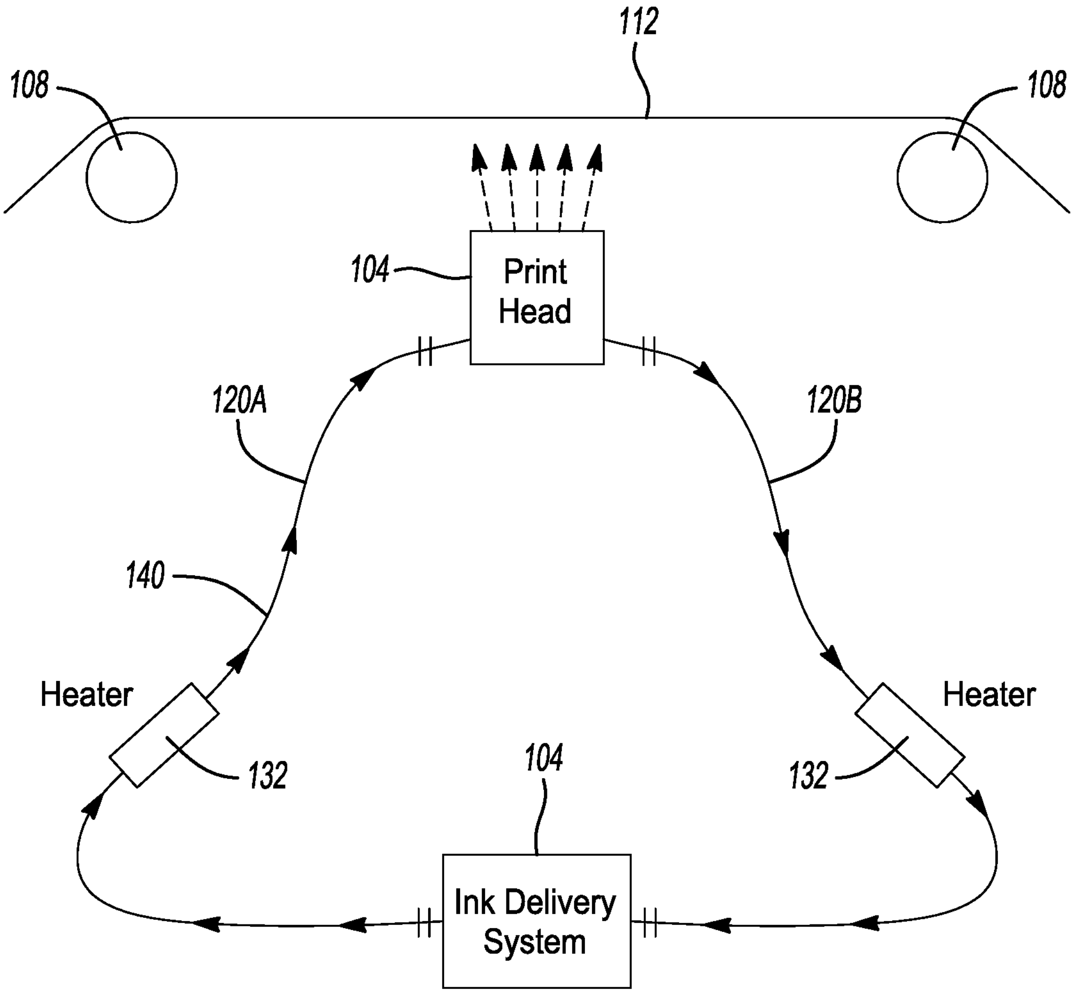
FIG. 3 depicts a schematic view of the upward jet printing system and movement of the ink supply according to one or more embodiments shown and described herein.

Referring now to FIGS. 2 and 3, the system 100 further include a closed loop and in-line system connecting the print head 104, to the heaters 132, and to the ink delivery system 130. In some embodiments, the ink delivery system 130 is a pump. In other systems, the ink deliver system 130 is any system capable of moving ink through the lines 140 connecting the components together. The closed loop and in-line system 100 is pressurized Alternatively, the system may be under vacuum instead of pressure as well moving from a low vacuum side to a higher vacuum side.

As shown in FIG. 3, ink moves from the ink delivery system 130 through the line 140 to the first heater 132. The ink is heated by the heater to achieve the Desired value. The value between pressure and meniscus taking into consideration nozzle plate offset from ink supply is measured in inches. The desired value (of the difference between the pressure and meniscus) is 10-14".

Ink then moves though the line 140 to the print head 104 where it is directed upwards through the jets to the media 112. Remaining ink continues through the in-line closed system to the second header (also 132) and back to the ink delivery system.

By controlling the temperature of the ink, a desired viscosity can be achieved to allow the ink to shoot upwards. By controlling the temperature of the ink, a desired meniscus can be achieved to allow the ink to shoot upwards. By controlling the temperature of the ink, a desired pressure can be achieved to allow the ink to shoot upwards.

Total meniscus equals the nozzle plate standoff from ink delivery—meniscus with a range target of 9-13". Said target range is mechanically and electronically set during manufacturing and is more of a theoretical value utilizing pressure, meniscus, and gravity to determine the end target value.

Nozzle plate standoff distance to ink delivery is the mechanical distance between the top of the print head nozzle plate and the ink delivery vessel. Heat range differs based on the fluid being jetted but currently the actual liquid temperature using the current fluid needs to be 42-52° C. Ink viscosity is measured in cP (Centipoise) and is determined based on a viscosity sweep of any given liquid. The target cP value correlates with the type of print head being used (variable) and the jetting fluid properties (variable). In some embodiments, the target cP value to jet correctly was less than 10 cP which requires a 50 C fluid temperature to achieve.

The 9-13" range is a reference of the nozzle plate standoff value subtracting meniscus settings. Meniscus and pressure are forms of vacuum (vacuum measured in inches of water).

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of, or even consist of the elements, ingredients, components or steps.

Plural elements, ingredients, components, or steps can be provided by a single integrated element, ingredient, component or step. Alternatively, a single integrated element, ingredient, component, or step might be divided into separate plural elements, ingredients, components or steps. The disclosure of "a" or "one" to describe an element, ingredient, component, or step is not intended to foreclose additional elements, ingredients, components or steps. All references herein to elements or metals belonging to a certain group refer to the Periodic Table of the Elements published and copyrighted by CRC Press, Inc., 1989. Any reference to the group or groups shall be to the group or groups as reflected in this Periodic Table of the Elements using the IUPAC system for numbering groups.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any utility application) cover all such changes and modifications that are within the scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

What is claimed is:

1. An upward jetting printing system configured to deposit ink on media, the system comprising:

- a print head, the print head configured to direct ink in an upward direction;
- an ink delivery system configured to move ink through the system; and
- at least one heater, the heater configured to heat the ink to a predetermined temperature;
- wherein the ink delivery system, the heater, and the print head are connected together under pressure in line together;
- wherein ink moves from the ink delivery system to the heater and to the print head wherein unused ink returns back to the ink delivery system.

2. The upward jetting printing system of claim 1 wherein the print head shoots ink upwards in a generally vertical direction.

3. The upward jetting printing system of claim 1 wherein the media moves in a generally horizontal direction over the print head during the printing process.

4. The upward jetting printing system of claim 1 wherein the media is moved by means of at least one roller.

5. The upward jetting printing system of claim 1 wherein the ink delivery system is a pump.

6. The upward jetting printing system of claim 1 wherein the predetermined temperature is between 30-75° C.

7. The upward jetting printing system of claim 1 wherein a second heater is positioned in-line between the print head and the ink delivery system in a return line.

8. The upward jetting printing system of claim 1 comprising the steps of:

- determining pressure of the in-line system;
- determining meniscus of the in-line system;
- determining the difference between meniscus and pressure resulting in a value; and
- adjusting the temperature of the heater to achieve desired upward printing result with a desired value.

9. An upward jetting printing system configured to deposit ink on media, the system comprising:

- a print head, the print head configured to direct ink in an upward direction;
- an ink delivery system configured to move ink through the system;
- a first heater, the heater configured to heat the ink to a predetermined temperature; and
- a second heater, the second heater positioned in line between the print head and the in delivery system when returning the ink back to the ink delivery system;
- wherein the ink delivery system, the heater, and the print head are connected together under pressure in line together;
- wherein ink moves from the ink delivery system to the heater and to the print head wherein unused ink returns back to the ink delivery system.

10. The upward jetting printing system of claim 9 wherein the print head shoots ink upwards in a generally vertical direction.

11. The upward jetting printing system of claim 9 wherein the media moves in a generally horizontal direction over the print head during the printing process.

12. The upward jetting printing system of claim 9 wherein the media is moved by means of at least one roller.

13. The upward jetting printing system of claim 9 wherein the ink delivery system is a pump.

14. The upward jetting printing system of claim 9 wherein the predetermined temperature is between 30-75° C.

15. The upward jetting printing system of claim 9 comprising the steps of:

- determining pressure of the in-line system;
- determining meniscus of the in-line system;
- determining the difference between meniscus and pressure resulting in a value; and
- adjusting the temperature of the heater to achieve desired upward printing result with a desired value.

* * * * *